United States Patent
Hasberg et al.

(10) Patent No.: US 11,442,913 B2
(45) Date of Patent: Sep. 13, 2022

(54) METHOD AND DEVICE FOR CREATING A LOCALIZATION MAP

(71) Applicant: Robert Bosch GmbH, Stuttgart (DE)

(72) Inventors: Carsten Hasberg, Ilsfeld-Auenstein (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 16/983,756

(22) Filed: Aug. 3, 2020

(65) Prior Publication Data
US 2021/0089506 A1 Mar. 25, 2021

(30) Foreign Application Priority Data
Sep. 24, 2019 (DE) .................. 102019214603.1

(51) Int. Cl.
*G06F 16/22* (2019.01)
*G06N 20/00* (2019.01)

(52) U.S. Cl.
CPC ......... *G06F 16/2237* (2019.01); *G06N 20/00* (2019.01)

(58) Field of Classification Search
CPC ...... G06F 16/2237; G06F 16/29; G06N 20/00
See application file for complete search history.

(56) References Cited

U.S. PATENT DOCUMENTS

| | | | |
|---|---|---|---|
| 2019/0204089 A1* | 7/2019 | Rochan Meganathan | G06V 20/56 |
| 2019/0226854 A1 | 7/2019 | Geissler et al. | |
| 2019/0244517 A1* | 8/2019 | Moustafa | G08G 1/0112 |
| 2019/0258737 A1* | 8/2019 | Wang | G06V 20/56 |
| 2019/0361454 A1* | 11/2019 | Zeng | G05D 1/0214 |
| 2020/0166363 A1* | 5/2020 | McGavran | G01C 21/3614 |
| 2021/0133218 A1* | 5/2021 | Bukowski | G06F 16/29 |

FOREIGN PATENT DOCUMENTS

| | | |
|---|---|---|
| DE | 102015225472 A1 | 6/2017 |
| DE | 102017122440 A1 | 3/2019 |

\* cited by examiner

*Primary Examiner* — Dangelino N Gortayo
(74) *Attorney, Agent, or Firm* — Norton Rose Fulbright US LLP; Gerard Messina

(57) ABSTRACT

A method and device for creating a localization map, including a step of receiving environmental data values, a step of dividing the environmental data values into at least two separate data records, a step of creating a plurality of partial maps, a step of creating the localization map and a step of making the localization map available.

6 Claims, 1 Drawing Sheet

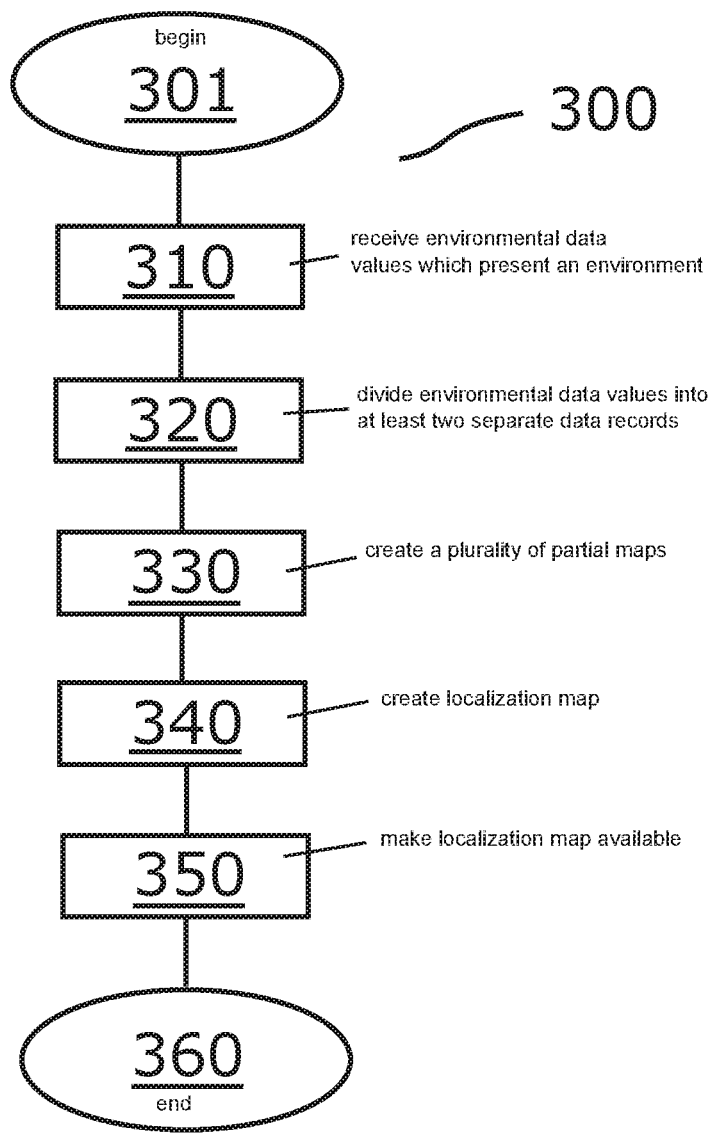

METHOD AND DEVICE FOR CREATING A LOCALIZATION MAP

CROSS REFERENCE

The present application claims the benefit under 35 U.S.C. § 119 of German Patent Application No. DE 102019214603.1 filed Sep. 24, 2019, which is expressly incorporated herein by reference in its entirety.

SUMMARY

The present invention relates, inter alia, to a method for creating a localization map, having a step of receiving environmental data values, a step of dividing the environmental data values into at least two separate data records, a step of creating a plurality of partial maps, a step of creating the localization map based on the plurality of partial maps, and a step of making the localization map available.

In accordance with an example embodiment of the present invention, the method for creating a localization map includes a step of receiving environmental data values which represent an environment of at least one vehicle, a step of dividing the environmental data values into at least two separate data records and a step of creating a plurality of partial maps based on the at least two separate data records. The method further includes a step of creating the localization map, based on the plurality of partial maps, depending upon a consistency check of the plurality of partial maps, and a step of making the localization map available.

For example, the environmental data values are acquired utilizing a driving environment sensor system of a vehicle, and subsequently transmitted for reception (with the aid of a server, etc.; here: device). A driving environment sensor system is understood to be at least one video sensor and/or at least one radar sensor and/or at least one lidar sensor and/or at least one further sensor which is designed to sense an environment of a vehicle in the form of environmental data values. To that end, in one possible specific embodiment, for example, the driving environment sensor system includes an arithmetic logic unit (processor, random-access memory, hard disk) having suitable software and/or is connected to such an arithmetic logic unit.

For instance, environmental data values are understood to be data values which are acquired by more than one driving environment sensor system (of various vehicles) and/or at different points in time. In one specific embodiment, for instance, the environmental data values include video- and radar data of a (comparable) environment, the video- and radar data being acquired by a driving environment sensor system of one vehicle or of various vehicles.

For example, an environment is understood here to be an area which is able to be sensed by the driving environment sensor system. In one specific embodiment, an environment of at least one vehicle is understood to be an at least partially overlapping area of subareas, each subarea corresponding to an environment of one vehicle.

For instance, creation of a map (here: a plurality of partial maps and/or a localization map) is understood to be the insertion of the environmental data values into a basemap. In one specific embodiment, for instance, the creation includes the insertion of environmental features, which are included in the surrounding area, into this basemap. A basemap is understood to be raw map data, for example, and/or an already existing (digital) map.

In particular, creation of a plurality of partial maps is understood to mean that—starting from the at least two separate data records—at least two partial maps are created which represent different aspects (different sensors, e.g., video and radar, etc., different times of acquisition, day and night, etc., different weather conditions, different traffic conditions and/or traffic densities, etc.) of the environment.

A consistency check of the at least two partial maps is understood to be a check as to whether the at least two partial maps are able to be merged to form one common map (here: localization map). In this context, it is checked, for example, whether the at least two partial maps—based on individual environmental features—are congruent (within predetermined tolerance ranges) and/or are able to be made congruent. The result of the consistency check is evaluated in order to identify errors in the map creation. If the consistency check fails, an error in the mapping may be inferred. This step is thus part of a safety concept within the meaning of ISO 26262/ISO/PAS 21448, and even within the framework of non-safety-critical applications, contributes to an increased error detection rate and therefore quality of the localization map created.

Creation of the localization map, depending upon a consistency check of the plurality of partial maps, is understood to mean that all partial maps—which are able to be merged based on the consistency check carried out—are merged to form the localization map. In one specific embodiment, it is to be understood here, for example, that all environmental features which are included by precisely these partial maps are integrated into one common map—which subsequently corresponds to the localization map.

For example, an environmental feature is understood to be an object (traffic sign, infrastructure features (e.g., guardrail, road routing, tunnel, bridges, etc.), building, etc.) which is able to be sensed with the aid of a driving environment sensor system of a vehicle and/or classified or assigned. Additionally or alternatively, in one specific embodiment, for example, an environmental feature is understood to be a course of the road (number of lanes, radius of curve, etc.) and/or a pattern of several—e.g., repeating—objects (e.g., a characteristic sequence of traffic signs, etc.).

For instance, a map is understood to be a digital map which is present in the form of (map-) data values on a storage medium. For example, the map is formed in such a way that it includes one or more map layers, as an example, one map layer showing a map from the bird's-eye perspective (course and position of roads, buildings, landscape features, etc.). This corresponds to a map of a navigation system, for example. A further map layer includes a radar map, for instance, the localization features which are included by the radar map being stored with a radar signature. A further map layer includes a lidar map, for example, the localization features which are included by the lidar map being stored with a lidar signature.

In particular, the localization map is formed in such a way that it is suitable for the navigation of a vehicle, especially an automated vehicle. This is understood to mean, for example, that the localization map is formed to determine a highly accurate position of the (automated) vehicle by matching the localization map with acquired sensor data values of this (automated) vehicle. To that end, for instance, the localization map includes environmental features with highly accurate position information (coordinates).

An automated vehicle is understood to be a vehicle which is designed in accordance with one of the SAE levels 1 through 5 (see SAE Standard J3016).

A highly accurate position is understood to be a position which is so accurate within a predetermined coordinate system, e.g., WGS84 coordinates, that this position does not exceed a maximum permissible uncertainty. In this context, the maximum uncertainty may be a function of the environment, for example. Furthermore, the maximum uncertainty may depend, e.g., on whether a vehicle is being operated manually or in partially automated, highly automated or fully automated fashion (in accordance with one of the SAE levels 1 through 5). In principle, the maximum uncertainty is so slight that, specifically, safe operation of the (automated) vehicle is ensured. For fully automated operation of an automated vehicle, the maximum uncertainty is on the order of approximately 10 centimeters, for example.

Making the localization map available is understood to mean, e.g., that the localization map is stored so that it is able to be called up and/or is transmittable, or is transmitted. In one specific embodiment, for instance, making available is understood to mean the transmission of the localization map to at least one (automated) vehicle and/or to a further server and/or into a cloud.

The example method according to the present invention advantageously achieves the object of providing a method for creating a localization map. This objective may be achieved with the aid of the example method according to the present invention, by dividing received environmental data values into at least two separate data records and subsequently creating a plurality of partial maps—based on the at least two separate data records—as well as creating the localization map—based on the plurality of partial maps. This demonstrates the advantage that localization maps are created with an advantageous influencing of the reliability of the map generation and the vehicle localization. This is an important safety measure within the framework of a safety concept for a feature-based vehicle localization.

By preference, the dividing is carried out as a function of at least one division criterion. Specifically, the at least one division criterion is selected as a function of environmental properties of the surrounding area.

Dividing—as a function of at least one division criterion, in particular, the at least one division criterion being selected as a function of environmental properties of the surrounding area—is understood to mean, for example, that the environmental data values are filtered or searched through according to predetermined criteria (environmental properties) and subsequently stored separately in accordance with the criteria. For instance, possible division criteria are the various aspects already described above. In particular, division criteria are understood to be times of acquisition (day or night; predetermined time periods of acquisition (mornings; 6-10 o'clock, . . . ), etc.) and/or weather conditions (sunny, clear, cloudy, etc.) and or sensor types (one data record includes all video data, another data record all radar data, etc.) and/or traffic conditions (one data record includes the environmental data values which were acquired during—according to predetermined criteria—high traffic density, a further data record includes the environmental data values which were acquired during—according to predetermined criteria—light traffic density, etc.) and/or further criteria.

The at least one division criterion is selected preferably as a function of a weighting of the environmental properties, the weighting being based on predetermined criteria and/or on a machine learning approach.

For instance, weighting is to be understood to mean that certain division criteria are applied preferentially, other division criteria only being applied when, for example, certain requirements of the environmental data values are satisfied. As an example, dividing according to day and night makes no sense if no data are available which were acquired at night.

Weighting according to predetermined criteria is understood to mean, for instance, that the weighting was derived in advance from empirical data—studies, analyses, tests, etc.

Weighting which is based on a machine learning approach is understood to mean, for example, that the weighting—especially relative to predetermined results—is carried out depending on the actual form of the environmental data values (e.g., number of vehicles, frequency of individual sensor types, frequency of individual times or time periods of acquisition, etc.) utilizing a suitable machine learning algorithm.

Preferably, the consistency check is carried out with the aid of a similarity metric, specifically with the aid of a similarity metric and an identification, based thereon, and/or minimization of effects of mapping errors.

For instance, a similarity metric is understood to be the Hausdorff metric and/or OSPA metric and/or further metrics.

An example device of the present invention, particularly an arithmetic logic unit, is equipped to carry out all steps of the method according to one of the method claims.

In one possible specific embodiment of the present invention, the device includes an arithmetic logic unit (processor, random-access memory, hard disk) as well as suitable software to carry out the method according to one of the method claims. To that end, for instance, the device includes a transmission—and/or reception unit which is designed to transmit and/or to receive environmental data values and/or a localization map—particularly with a vehicle and/or external server or a cloud—or is connected by a suitable interface to a transmission—and/or reception device. In a further specific embodiment, the device takes the form of server or cloud (thus, a network of servers and arithmetic logic units, respectively).

In addition, a computer program is provided, including commands that, upon execution of the computer program by a computer, cause it to carry out a method according to one of the method claims. In one specific embodiment, the computer program corresponds to the software included by the device.

Moreover, a machine-readable storage medium is provided, on which the computer program is stored.

Advantageous further developments of the present invention are described herein and shown in the FIGURES.

BRIEF DESCRIPTION OF THE DRAWINGS

Exemplary embodiments of the present invention are represented in the figures and explained in greater detail below.

FIG. 1 shows an exemplary embodiment of the method according to the present invention in the form of a flowchart.

DETAILED DESCRIPTION OF EXAMPLE EMBODIMENTS

FIG. 1 shows an exemplary embodiment of a method 300 for creating 340 a localization map.

In step 301, method 300 begins.

In step 310, environmental data values which represent an environment of at least one vehicle are received.

In step 320, the environmental data values are divided into at least two separate data records.

In step 330, a plurality of partial maps are created, based on the at least two separate data records.

In step 340, the localization map is created, based on the plurality of partial maps, depending upon a consistency check of the plurality of partial maps.

In step 350, the localization map is made available.

In step 360, method 300 ends.

What is claimed is:

1. A method for creating a localization map, the method comprising:
receiving environmental data values which represent an environment of at least one vehicle, wherein the environmental data values are acquired utilizing a driving environment sensor system of a vehicle, and subsequently transmitted for reception, and wherein the environment of the at least one vehicle includes at least a partially overlapping area of subareas, each of the subareas corresponding to an environment of one vehicle;
dividing the environmental data values into at least two separate data records;
creating a plurality of partial maps, based on the at least two separate data records;
creating the localization map, based on the plurality of partial maps, depending upon a consistency check of the plurality of partial maps; and
making the localization map available;
wherein the creating of the plurality of partial maps includes inserting environmental features, which are included in a surrounding area, into a basemap,
wherein the creating of the plurality of partial maps includes starting from the at least two separate data records, in which at least two partial maps are created which represent different aspects, including at least two of: different sensors, different times of acquisition, different weather conditions, different traffic conditions and/or traffic densities, of the environment,
wherein the consistency check of the at least two partial maps includes a check of whether the at least two partial maps are merge-able to form the localization map, and wherein it is checked whether the at least two partial maps, based on individual environmental features, are congruent within predetermined tolerance ranges and/or are able to be made congruent,
wherein a result of the consistency check is evaluated to identify errors in the creating of the plurality of partial maps, and when the consistency check fails, an error in the mapping is inferred.

2. The method as recited in claim 1, wherein the dividing is carried out as a function of at least one division criterion, the at least one division criterion being selected as a function of environmental properties of a surrounding area.

3. The method as recited in claim 2, wherein the at least one division criterion is selected as a function of a weighting of the environmental properties, the weighting being based on predetermined criteria and/or on a machine learning approach.

4. The method as recited in claim 1, wherein the consistency check is carried out using a similarity metric and an identification, based on the similarity metric, and minimization of an effect of mapping errors.

5. An apparatus for creating a localization map, comprising:
an the arithmetic logic unit configured to perform the following:
receiving environmental data values which represent an environment of at least one vehicle, wherein the environmental data values are acquired utilizing a driving environment sensor system of a vehicle, and subsequently transmitted for reception, and wherein the environment of the at least one vehicle includes at least a partially overlapping area of subareas, each of the subareas corresponding to an environment of one vehicle;
dividing the environmental data values into at least two separate data records;
creating a plurality of partial maps, based on the at least two separate data records;
creating the localization map, based on the plurality of partial maps, depending upon a consistency check of the plurality of partial maps; and
making the localization map available;
wherein the creating of the plurality of partial maps includes inserting environmental features, which are included in a surrounding area, into a basemap,
wherein the creating of the plurality of partial maps includes starting from the at least two separate data records, in which at least two partial maps are created which represent different aspects, including at least two of: different sensors, different times of acquisition, different weather conditions, different traffic conditions and/or traffic densities, of the environment,
wherein the consistency check of the at least two partial maps includes a check of whether the at least two partial maps are merge-able to form the localization map, and wherein it is checked whether the at least two partial maps, based on individual environmental features, are congruent within predetermined tolerance ranges and/or are able to be made congruent,
wherein a result of the consistency check is evaluated to identify errors in the creating of the plurality of partial maps, and when the consistency check fails, an error in the mapping is inferred.

6. A non-transitory machine-readable storage medium on which is stored a computer program, which is executable by a processor, comprising:
a program code arrangement for creating a localization map, by performing the following:
receiving environmental data values which represent an environment of at least one vehicle, wherein the environmental data values are acquired utilizing a driving environment sensor system of a vehicle, and subsequently transmitted for reception, and wherein the environment of the at least one vehicle includes at least a partially overlapping area of subareas, each of the subareas corresponding to an environment of one vehicle;
dividing the environmental data values into at least two separate data records;
creating a plurality of partial maps, based on the at least two separate data records;
creating the localization map, based on the plurality of partial maps, depending upon a consistency check of the plurality of partial maps; and
making the localization map available;
wherein the creating of the plurality of partial maps includes inserting environmental features, which are included in a surrounding area, into a basemap,
wherein the creating of the plurality of partial maps includes starting from the at least two separate data records, in which at least two partial maps are created which represent different aspects, including at least two of: different sensors, different times of acquisition, different weather conditions, different traffic conditions and/or traffic densities, of the environment, wherein the consistency check of the at least two partial maps includes a check of whether the at least two partial maps are merge-able to form the localization map, and wherein it is checked whether the at least two partial maps, based on individual environmental features, are congruent within predetermined tolerance ranges and/or are able to be made congruent, wherein a result of the consistency check is evaluated to identify errors in the creating of the plurality of partial maps, and when the consistency check fails, an error in the mapping is inferred.

\* \* \* \* \*